(12) United States Patent
Richardson et al.

(10) Patent No.: US 7,934,594 B2
(45) Date of Patent: May 3, 2011

(54) CONVEYOR SYSTEM FOR VEHICLE

(75) Inventors: Shannon B. Richardson, Earlville, IA (US); Mark S. Hollinrake, Marion, IA (US); Mart E. Ward, Manchester, IA (US); Andrew M. Holverson, Manchester, IA (US)

(73) Assignee: Henderson Products, Inc., Manchester, IA (US)

( * ) Notice: Subject to any disclaimer, the term of this patent is extended or adjusted under 35 U.S.C. 154(b) by 250 days.

(21) Appl. No.: 12/390,967

(22) Filed: Feb. 23, 2009

(65) Prior Publication Data

US 2009/0269183 A1 Oct. 29, 2009

Related U.S. Application Data

(60) Provisional application No. 61/066,729, filed on Feb. 22, 2008.

(51) Int. Cl.
*B65G 23/44* (2006.01)
(52) U.S. Cl. .................... 198/813; 198/810.04; 414/527
(58) Field of Classification Search ............... 198/750.2, 198/751, 813, 810.04, 832, 835; 414/525.9, 414/527, 528
See application file for complete search history.

(56) References Cited

U.S. PATENT DOCUMENTS

| | | | | |
|---|---|---|---|---|
| 2,916,169 A * | 12/1959 | De Witt | ........................ | 414/528 |
| 3,000,521 A * | 9/1961 | Deputy | ........................ | 414/520 |
| 3,937,338 A * | 2/1976 | Cox | ............................... | 414/528 |
| 4,892,456 A * | 1/1990 | Hodgetts | ....................... | 414/527 |
| 4,892,958 A * | 1/1990 | Furstenwerth | ............. | 548/372.1 |
| 4,942,958 A * | 7/1990 | Marttila | ....................... | 198/833 |
| 5,203,447 A * | 4/1993 | Ewert | ........................... | 198/807 |
| 5,584,640 A * | 12/1996 | Johnson | ........................ | 414/502 |
| 6,871,737 B2 * | 3/2005 | Ertel et al. | ................. | 198/860.1 |
| 2006/0201777 A1 * | 9/2006 | Michel et al. | ................. | 198/311 |

\* cited by examiner

*Primary Examiner* — James R Bidwell

(74) *Attorney, Agent, or Firm* — Leydig, Voit & Mayer, Ltd.

(57) ABSTRACT

A conveyor system for a vehicle includes a belt auto-tensioning system that tensions the belt prior to belt movement but not necessarily during loading. Also included are a belt guidance system and a belt anti-slippage system. A fourth system aspect is a floating drive connection system with square or non-linear adaptor. Several benefits are obtained by using the conveyor system disclosed. Also provided are a method of using the conveyor system and a method of constructing a vehicle system combination conveyor.

30 Claims, 12 Drawing Sheets

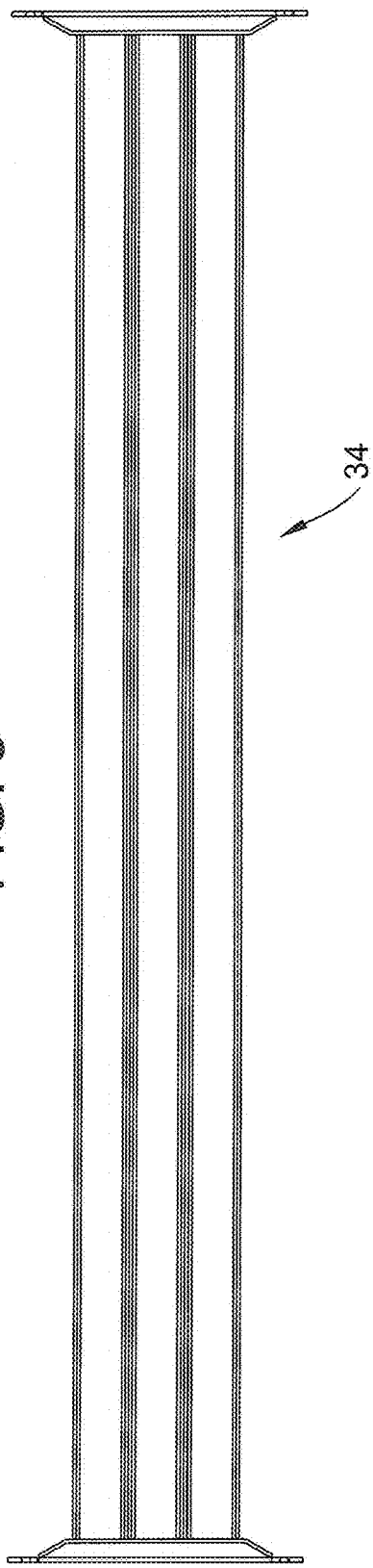
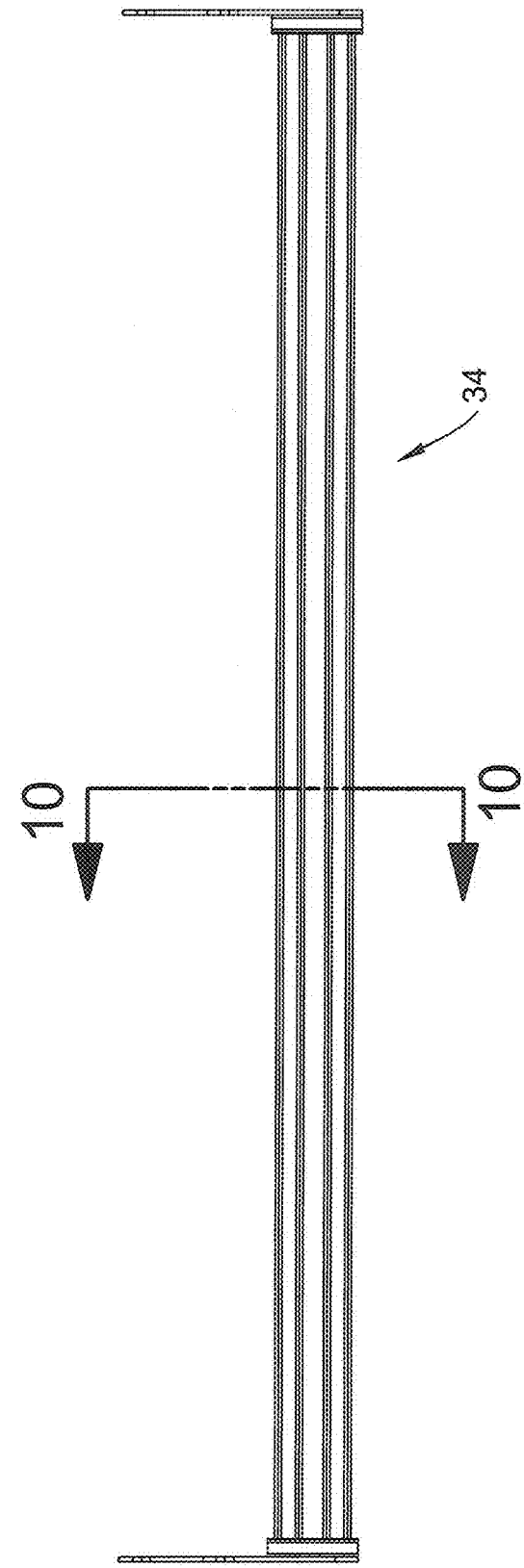
FIG. 8
FIG. 9

CONVEYOR SYSTEM FOR VEHICLE

CROSS-REFERENCE TO RELATED APPLICATION

This patent application claims the benefit of U.S. Provisional Patent Application No. 61/066,729, filed Feb. 22, 2008, the entire contents of which are incorporated herein by this reference.

TECHNICAL FIELD

The disclosure relates generally to conveyor systems, and more particularly to belt conveyor systems for vehicles.

BACKGROUND

Vehicles with a hoist system, such as dump trucks or dump trailers, can generally be used year-round. But such vehicles can be prone to unstable positions and even prone to catastrophic tip-over. Such vehicle tip-over tendencies are believed to be contributing to dramatically climbing insurance rates for hoist style vehicles, including trailer dump bodies and chassis-mounted dump bodies. Moreover, the operation of hoist style vehicles can also encounter problems by overhead utility lines or other obstacles such as bridges, vegetation, etc. which can make it difficult to operate the hoist safely and/or fully.

In contrast to hoist system vehicles, vehicles with a belt conveyor or "live-bottom" dump system do not tend to tip over or to interfere with overhead objects such as utility lines, bridges, and vegetation. However, vehicles with conveyor belts in the prior art generally cannot be used in the winter months and cannot haul some materials due to damage to the conveyor system, for example when materials being hauled damage the chain or belt.

Live-bottom vehicles are vehicles having an endless conveyor system that may be used to unload materials within the vehicle. One type of prior art live-bottom vehicle includes a length of roller chain extending along each side of the trailer with attached cross-members extending therebetween, and a belt fastened to the top of the chain. Another type of prior art live-bottom vehicle includes roller chains, and a belt that surrounds but is not fastened to the chain. In this type of live-bottom vehicle, the roller chain is driven and the weight of the load material on the belt maintains frictional contact between the chain and the belt that is sufficient to cause travel of the belt as the chain is rotated.

Another type of prior art live-bottom vehicle uses a conveyor belt that travels over a solid floor of the vehicle; however, live-bottom vehicles of this type can suffer from several drawbacks. Generally, this type of live-bottom-trailer typically does not provide proper tensioning of the belt. Poor tensioning causes belt slippage and a loss of traction which typically results in poor unloading ability. In some cases, poor tensioning may result in a total loss of traction and drive capability, necessitating manual unloading of the trailer. Further, this type of live-bottom trailer often experiences problems associated with tracking of the belt. Tracking of the belt is important for proper operation of the conveyor and good unloading ability. There exists a continuing need for improved vehicle conveyor systems.

BRIEF SUMMARY OF THE INVENTION

The disclosure relates to a conveyor system for a vehicle with vertical-tending walls and a floor space containing a friction reducing plastic material. The chassis mounted conveyor system has a belt, a first roller positioned adjacent the first end of the floor, and a second roller positioned adjacent the second end of the floor. The conveyor system has a belt auto-tensioning system adapted to automatically tension the belt prior to belt movement. The conveyor system has a belt guidance system adapted to automatically align the belt. The conveyor system has a belt anti-slippage system including a first roller and a drive drum coupled thereto for driving the belt, said drum comprising rubber vulcanized to a steel drum surface, and a snubber roller adapted to engage the belt against an exterior cylindrical surface of the drive drum such that the snubber roller covers at least about ¾ of the cylindrical surface of the drum. The conveyor also has a floating drive connection system including the drive drum having a nonlinear or square adaptor.

In another aspect of the disclosure, a method of using a vehicle with a conveyor system is described. The method includes providing a vehicle with vertical-tending walls and a floor space containing a friction reducing plastic material, and a chassis mounted conveyor system, wherein the conveyor system has a belt, a first roller positioned adjacent the first end of the floor, a second roller positioned adjacent the second end of the floor. The conveyor system also has a belt auto-tensioning system adapted to automatically tension the belt prior to belt movement; a belt guidance system adapted to automatically align the belt; a belt anti-slippage system including a drive drum having rubber vulcanized to a steel drum surface coupled to a first roller for driving the belt and a snubber roller adapted to engage the belt against an exterior cylindrical surface of the drive drum such that the snubber roller covers at least about ¾ of the cylindrical surface of the drum; and a floating drive connection system including the drive drum having a square adaptor. The vehicle can be loaded under effectively relaxed belt conditions. The auto-tensioning system can be operated prior to moving the belt. The vehicle can be unloaded by operating the belt.

In yet another aspect of the disclosure, a method of constructing a vehicle with a conveyor system is described. The method includes the step of providing a vehicle with vertical-tending walls and a floor space containing a friction reducing plastic material. A chassis mounted conveyor system can be installed in the vehicle, wherein the conveyor system has a belt, a first roller positioned adjacent the first end of the floor, a second roller positioned adjacent the second end of the floor. The conveyor system also has a belt auto-tensioning system adapted to automatically tension the belt prior to belt movement; a belt guidance system adapted to automatically align the belt; a belt anti-slippage system including a drive drum having rubber vulcanized to a steel drum surface coupled to a first roller for driving the belt and a snubber roller adapted to engage the belt against an exterior cylindrical surface of the drive drum such that the snubber roller covers at least about ¾ of the cylindrical surface of the drum; and a floating drive connection system including the drive drum having a square adaptor.

BRIEF DESCRIPTION OF THE DRAWINGS

FIG. 8 is a top plan view of the belt guidance system of FIG. 7.

FIG. 9 is a front elevational view of the belt guidance system of FIG. 7.

DETAILED DESCRIPTION OF EMBODIMENTS OF THE INVENTION

Figure 1:
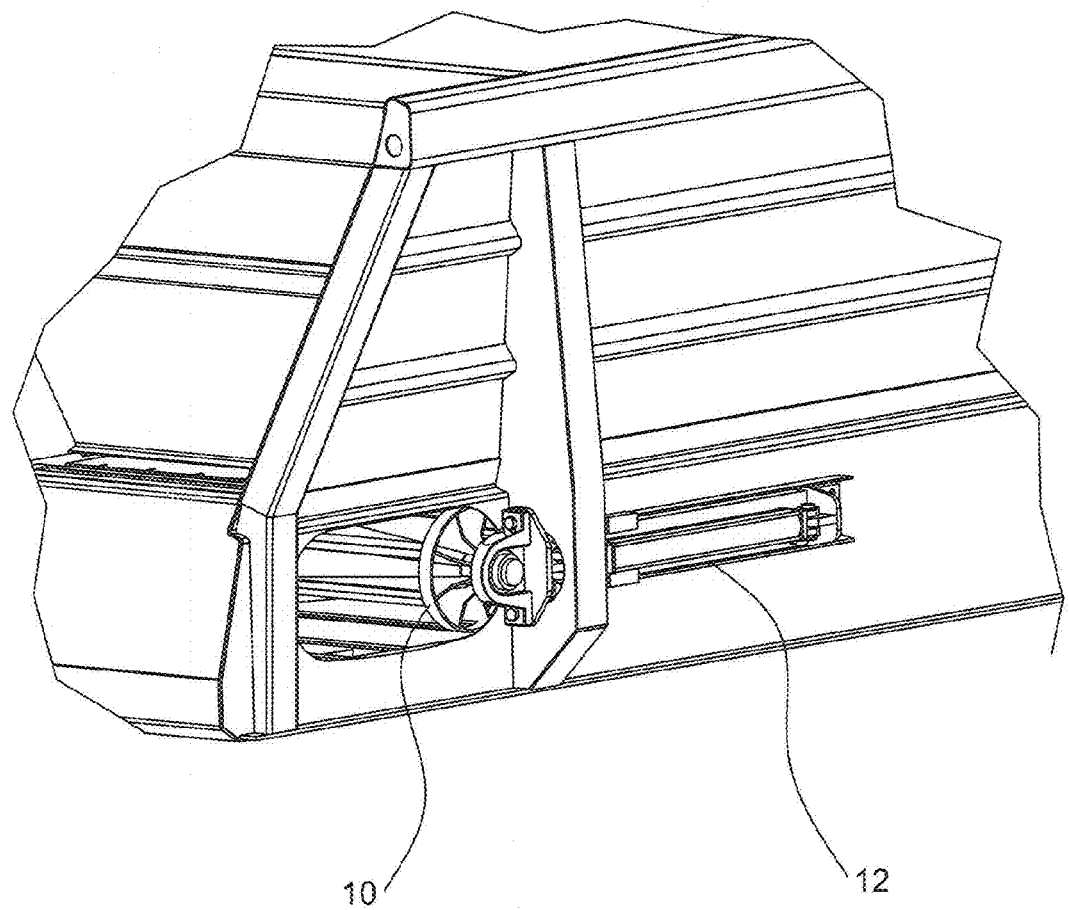
FIG. 1 is a fragmentary perspective view of an embodiment of a vehicle equipped with a conveyor system.

The invention provides a belt conveying system that can allow year round use and the ability to haul a wide variety of materials. Such a system may replace and/or supplement the prior art systems. Such supplementation can include use of the conveyor system in combination with other hoist systems, live-bottom systems, extruding dumps, reciprocating slat conveyors, such as those commercially available from Keith Mfg. Co. of Madras, Oregon, under the trade name walking floor®, side dumps, bottoms dumps and other types of material hauling, waste/trash/recycling vehicle systems.

The belt conveying system can include a belt auto-tensioning system, a belt guidance system, a belt anti-slippage system, and a floating drive connection system. The belt auto-tensioning system can automatically tension the belt only when it is necessary (prior to belt movement but not necessarily during loading). This has many advantages including extended belt life and durability during loading. The belt guidance system can automatically ensure that the belt remains aligned such that it does not become displaced and damage itself and/or other parts of the conveying system. The belt anti-slippage system can include a snubber roller to hold or wrap the belt against a drive drum about ¾ of the way around the drum. The anti-slippage system can also include a drive drum comprising rubber vulcanized to the steel drum surface, which can act in concert with the tensioning system to reduce belt slippage to thereby lengthen belt life and improve reliability of the overall conveying system. The anti-slippage system can include friction reduction mechanisms elsewhere in the vehicle, typically with generally vertical side wall construction, bottom plastic material on the conveyor floor to reduce drag, and a bare back belt design. The floating drive connection system can include a square adaptor that reduces the need for perfect side-to-side alignment and reduces the impact of normal variances (necessary construction tolerances) on the construction of the drive train which can improve reliability and extend the life of the expensive drive system elements. Also provided are a method of using a vehicle conveyor system and a method of constructing a vehicle conveyor system.

Vehicle systems such as with trailers or for material hauling are generally disclosed in the art as containing bodies, walls, and tires, for examples see U.S. Pat. Nos. 3,937,338 and 5,584,640 and U.S. Patent Application Publication No. 2006/0201777 A1, which are all incorporated herein by reference in their entireties. Vehicles preferred for the instant disclosure include a vehicle with vertical-tending walls and a floor space containing a friction reducing plastic material, and a chassis mounted conveyor system. Vertical-tending walls are sides that are generally vertical so that friction between the material being conveyed and the sides of the vehicle body wall is reduced. Preferably the walls are substantially vertical, which assists in reducing the drag of materials against the sides. Moreover, friction is also reduced when the belt rides on a layer of plastic material along the length of the conveyor floor, which further reduces friction between the belt and the floor to reduce drag on the belt.

The conveyor system can comprise a bare back belt, a first roller positioned toward the first end of the floor, and a second roller positioned toward the second end of the floor. The bare back belt can have a bottom layer of nylon cords or mesh exposed since rubber would provide greater friction on the floor. The belt can have two or three plies of fabric material, for example, and can be selected to withstand the stresses of adverse weather conditions and/or any heavy load pressures and/or temperatures. A rubber top cover can be implemented with about ¼ to ½ inch thickness, for example. Rubber between the cords also can provide cushioning and prevent the cords from damaging each other.

In at least one embodiment, a conveyor system for a vehicle is implemented where the system includes at least four elements combined together for a belt conveying system that provides many benefits over prior art systems and vehicles allowing year round use and the ability to haul a wide variety of materials. The conveyor system can include a belt auto-tensioning system element that tensions the belt only when it is necessary (prior to belt movement but not necessarily during loading), a belt guidance system, a belt anti-slippage system, and a floating drive connection system with a substantially square adaptor.

The belt auto-tensioning system can automatically tension the belt only when it is necessary (prior to belt movement, but not necessarily during loading). This element provides many advantages compared to normally tensioning systems including extended belt life and belt durability during loading. Since the belt is only under tension when you are driving it, this provides extended belt life and/or delays belt maintenance. Moreover, in embodiments where the belt is relaxed upon loading, better cushioning is observed by allowing the belt to flex at reduced tension. Auto tensioning is provided by cylinders or their equivalents sized to engage the belt to sufficient tension to avoid slippage prior to belt movement. Mechanical tension can be increased at a rate that exceeds the rate at which the drive drum can initially accelerate in order to avoid undesired belt slippage. The higher the load requirement of the conveyor, the more torque will be required to drive the conveyor, and consequently the auto tensioning system can provide more tensioning prior to belt movement. This auto-tensioning system feature works in conjunction with other conveyor systems as described in detail below, especially the anti-slippage system using friction since the belt preferably has no mechanical engagement with the belt drive system beyond frictional contact. In operation, as soon as the drum turns and moves the belt, there is potential for slack to occur at the end of drive roller contact due to inherent belt stretching that sometimes occurs. Any slack results in belt slippage upon belt movement, so an auto-tensioning system allows cylinders or their equivalents to compensate for any slack and/or belt stretching. Another of the advantages to the auto-tensioning system is that it allows the belt to relax during loading. When a belt is loaded under tension, belt fibers cannot withstand as great as impact factors as they can withstand when the belt is relaxed, which further prolongs belt life and quality.

The belt guidance system can automatically ensure that the belt does not get off center and damage itself and/or other parts of the conveying system. The belt guidance system is generally simple, effective, and inexpensive to implement. Guides may be placed at a slack point during loading, such as near the belt underside next to a second (or wing) roller away from the first (or drive) roller. If a two-way belt is used, then additional guides typically are implemented. Since the conveyor belt is a generally low speed belt that is required to make only about a half of a revolution in order to unload a vehicle, it means that about only 30 or so revolutions can be expected a day for most applications. The guide mechanism holds the lower belt portion relatively flat as it approaches the second (or wing) roller. The guide mechanism includes upper and lower portions extending inwardly from (or between) the lateral side portions of a belt conveyor system frame. The guide mechanism also comprises a second member extending between the lateral side portions of the frame. The first portions are positioned on one side of the lower belt portion. The second member is vertically positioned on the opposite side of the lower belt portion, and is horizontally positioned between the first members. In one embodiment, the first portions are located above the belt and the second member is located below the belt, however this orientation may be reversed if desired. The guide mechanism may also comprise a pair of vertical extending members positioned on opposite sides of the belt, each of the vertically extending members being horizontally positioned between the first portions. The vertically extending members allow the tracking of the belt to be adjusted by directing the edges of the belt away from the vehicle sides should the belt be tracking in that direction. The vertically extending members may be horizontally aligned with the second member. In some embodiments, the second member and/or vertically extending members are centered between the first portions.

The guide mechanism may be adapted to move with the second roller in response to changes in position of the second roller due to adjustments of the auto-tensioning system described above. For example, the first guide mechanism may be operably connected to the tensioning system or second roller to move the guide mechanism relative to a first roller such that relatively constant distance between the second roller and the guide mechanism. In some embodiments the first portions and second members are vertically extending members as cross-members, in other embodiments rollers may be used instead of cross-members or the like.

The belt anti-slippage system can include a snubber roller installed to hold or wrap the belt against a drive drum at least about ¾ of the way around the drum. This belt contact with the drive drum of about 270 degrees or greater can provide an effective contact area which increases the force of the belt against the drum to thereby increase the frictional driving force on the belt. The snubber roller makes this possible and its location, orientation, and size all can be adjusted to increase the effectiveness of the contact. Second, the construction of the drive drum, which is coupled to the first roller for driving the belt, is based on a drum having a rubber vulcanized (bonded) to the steel drum surface, which acts in concert with the tensioning system to eliminate belt slippage that lengthens belt life and improves reliability of the overall conveying system. The rubber-against-rubber engagement provides a very high coefficient of friction. Additionally, friction reduction elsewhere in the system, such as described above for the vehicle vertical tending walls, the plastic floor, and the bareback belt, further contribute to the effectiveness of the anti-slippage system through the combined overall conveyor system, which also has an automatically tensioned belt, which tension can be increased at a rate that exceeds the rate at which the drive drum can initially accelerate. This additional tensioning increases the normal force of the belt against the drive drum which increases frictional forces between the belt and the drum surface.

The floating drive connection system can be used with the square adaptor of the drive drum to substantially reduce the need for perfect side-to-side alignment and substantially reduce the impact of normal variances on the construction of the drive train. It is typically difficult on a drive roller to drive a rubber belt around a small radius wheel wherein if the wheel is too small the radial bend in the belt could cause cracks or other damage. Accordingly, a drive roller needs to be of suitable size in relation to belt thickness. A ratchet and socket square drive assists in providing torque transfer in a non-linear manner. The drive must be able to effectively deal with minute misalignments during construction and fractional distortion caused by flexing under load. An advantage of the square drive is that it provides forgiveness for instances of misalignment.

Figure 2:
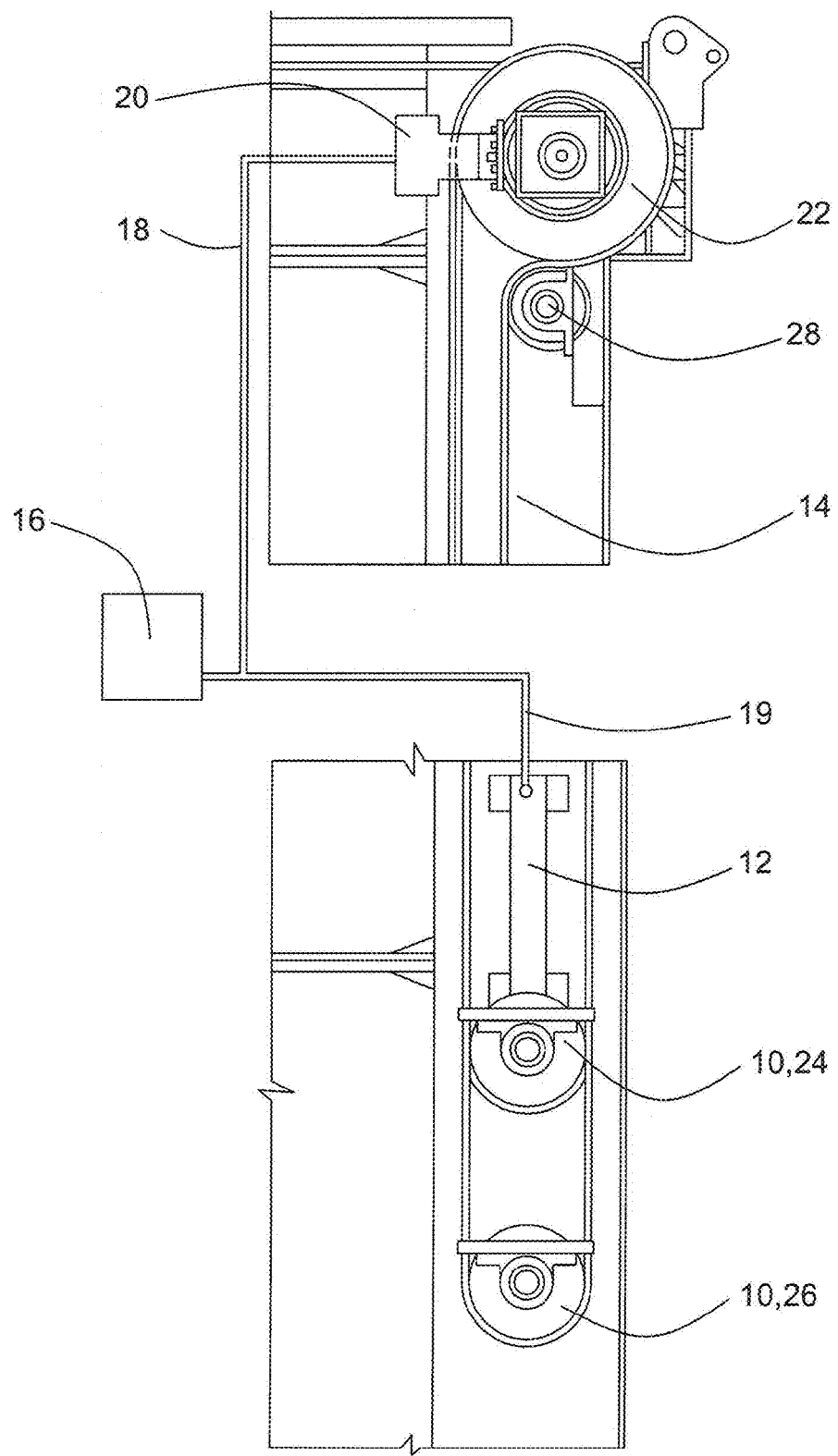
FIG. 2 is a schematic diagram of an embodiment of a hydraulic system of the conveyor system of FIG. 1.
Figure 3:
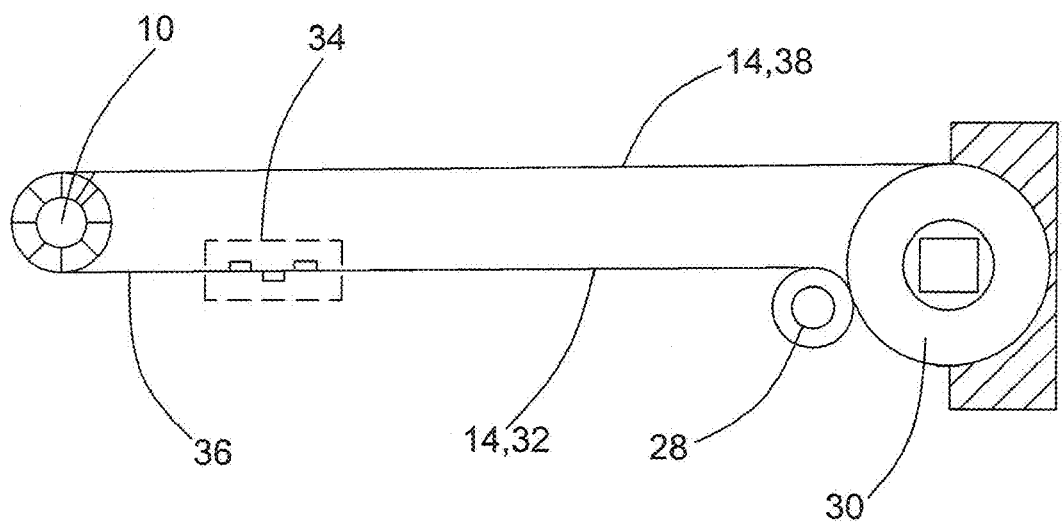
FIG. 3 is a schematic diagram of the vehicle conveyor system of FIG. 1 showing guiding and tracking mechanisms, along with a square style drive drum.

Turning now to the Figures, there is shown in FIGS. 1-3 a conveyor system for a vehicle. FIG. 1 shows a part of a conveyor system, showing a front faced second (or wing) roller 10, with cylinder 12 showing part of an auto-tensioning system. Also shown is a fin-based roller 10 design that permits easier cleaning for material that can move around the sides of the belt and into the roller 10. Thus, the roller 10 design shown is "self-cleaning" in that it allows for material trapped under the belt (not shown) to escape to the side.

FIG. 2 shows a side view of a basic hydraulic schematic of a first drive roller section and a second wing roller section. A hydraulic pump 16 is shown connected via hydraulic pressure lines 18, 19 to a hydraulically driven motor 20 connected to the drive roller 22 and to a hydraulic cylinder 12 in the auto-tensioning system. The wing roller 10 is shown in both a retracted (or slack) position 24 for loading and an extended (or tight) position 26 for belt 14 movement. Other features include a snubber roller 28 positioned as part of the anti-slippage system to maintain an approximately 270° belt 14 contact with the drive roller 22.

FIG. 3 shows an outline side view of a conveyor system with a belt guidance system and a floating drive connection system with a square (ratchet-wrench) style drive drum 30. The belt 14 return side 32 between the snubber roller 28 and the wing roller 10 is shown with an alignment guide 34 and a 'slack' point 36 between the alignment guide 34 and the wing roller 10. The belt 14 top side 38 is where any material to be conveyed is located.

Figures 4, 5:
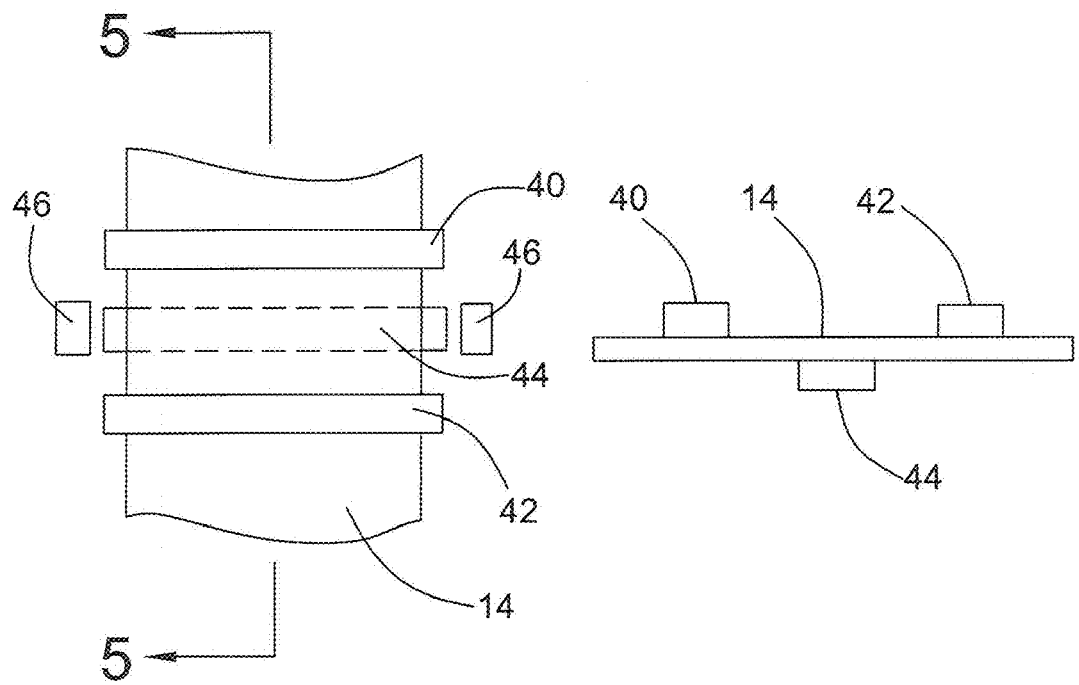
FIG. 4 is a schematic diagram of an embodiment of an alignment guide from a top view.
FIG. 5 is a schematic diagram of the alignment guide of FIG. 4 from a sectional view taken along line 5-5 in FIG. 4.

FIGS. 4 and 5 show the alignment guide 34 with a pair of horizontally spaced apart first members 40 and 42 extending between lateral side portions of a support frame (not shown). The alignment guide 34 also has a second member 44 extending between the lateral side portions of the support frame. The first members 40, 42 are positioned on one side of the lower belt portion 14. The second member 44 is vertically positioned on the opposite side of the lower belt portion 14, and is horizontally positioned between the first members 40 and 42 respectively. In the shown embodiment, the first members 40 and 42 are located above the belt 14 and the second member 44 is located below the belt 14, however this orientation may be reversed if desired. The alignment guide 34 may also comprise a pair of vertical extending members 46 positioned on opposite sides of the belt 14, each of the vertically extending members 46 being horizontally positioned between the first members 40 and 42 respectively. The vertically extending members 46 allow the tracking of the belt 14 to be adjusted by directing the edges of the belt 14 away from the sidewalls (not shown) should the belt 14 be tracking in that direction. The vertically extending members 46 may be horizontally aligned with the second members 44 as shown in FIGS. 4 and 5. In some embodiments, the second members 44 and/or vertically extending members 46 are centered between the first members 40 and 42 respectively.

Figure 6:
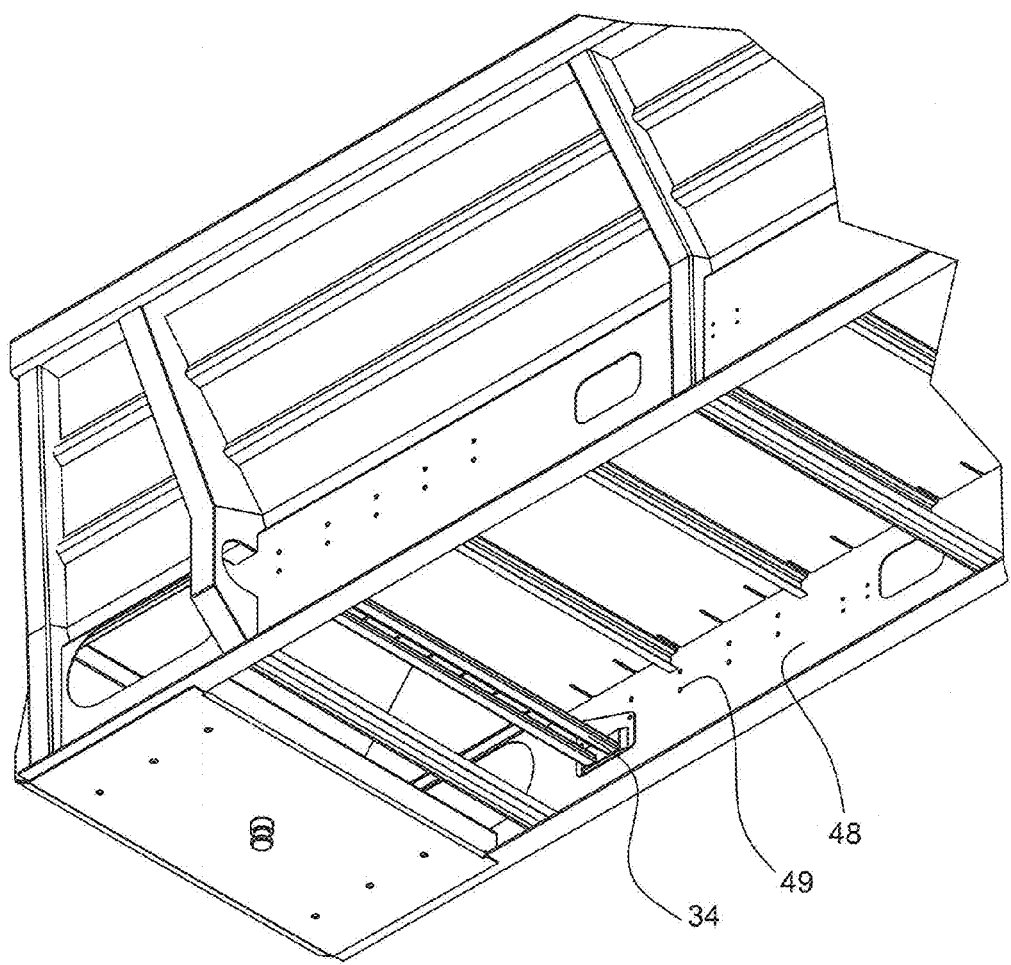
FIG. 6 is fragmentary perspective view of an embodiment of a vehicle conveyor system showing a belt guidance system.

FIG. 6 shows a fragmentary perspective view of an alignment guide 34 connected to a vehicle body 48. In this embodiment, the vehicle body 48 contains several possible mounting points for the alignment guide 34, which are shown as pairs of holes 49 disposed in spaced longitudinal relationship with each other along the body 48. These mounting holes 49 allow for the alignment guide 34 to be adjustably mounted to the body 48 such that the alignment guide can be positional in aligning fashion with a slack point in the conveyor belt.

Figure 7:
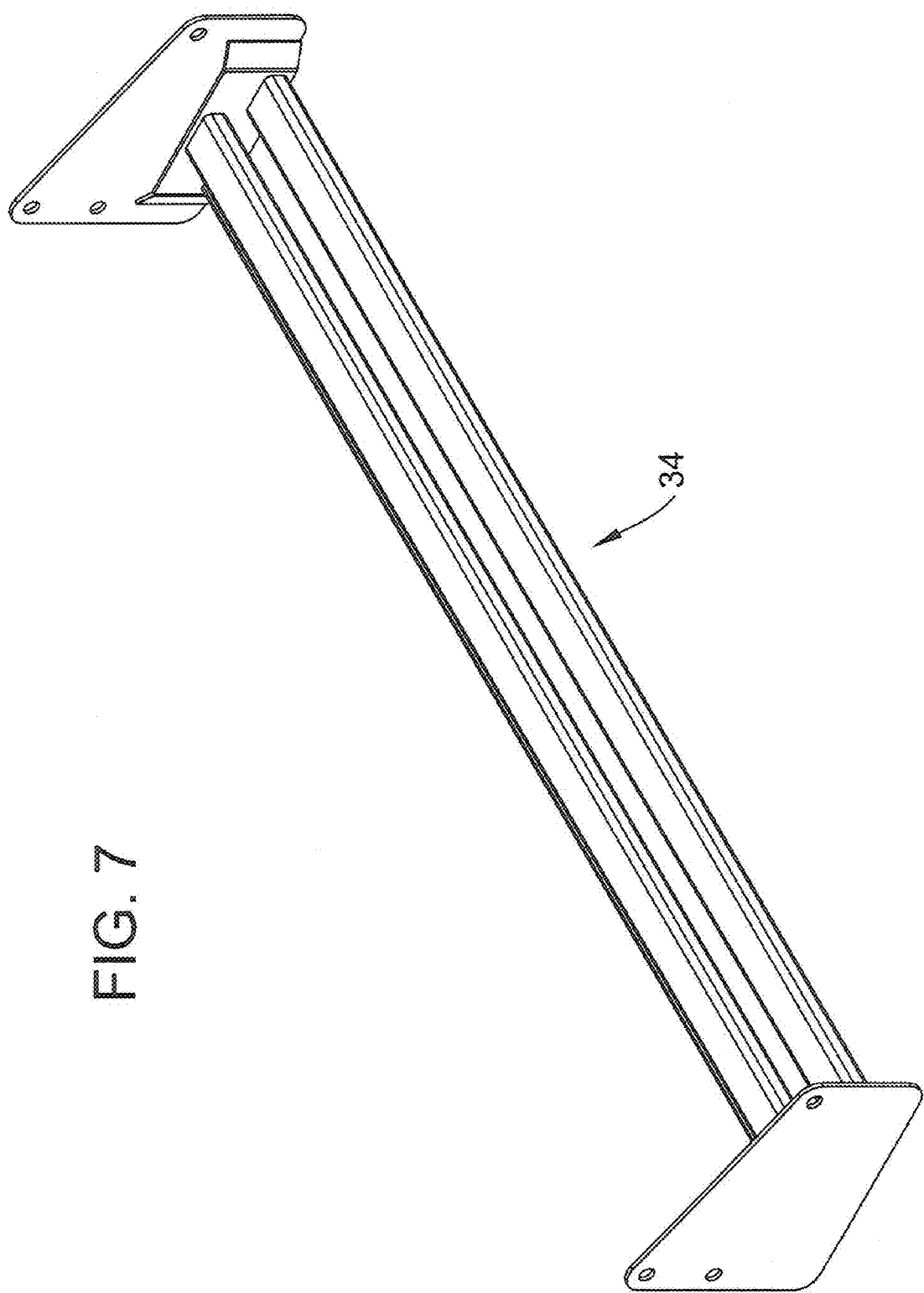
FIG. 7 is a perspective view of an embodiment of a belt guidance system suitable for use with a vehicle conveyor system according to the present invention.
Figure 10:
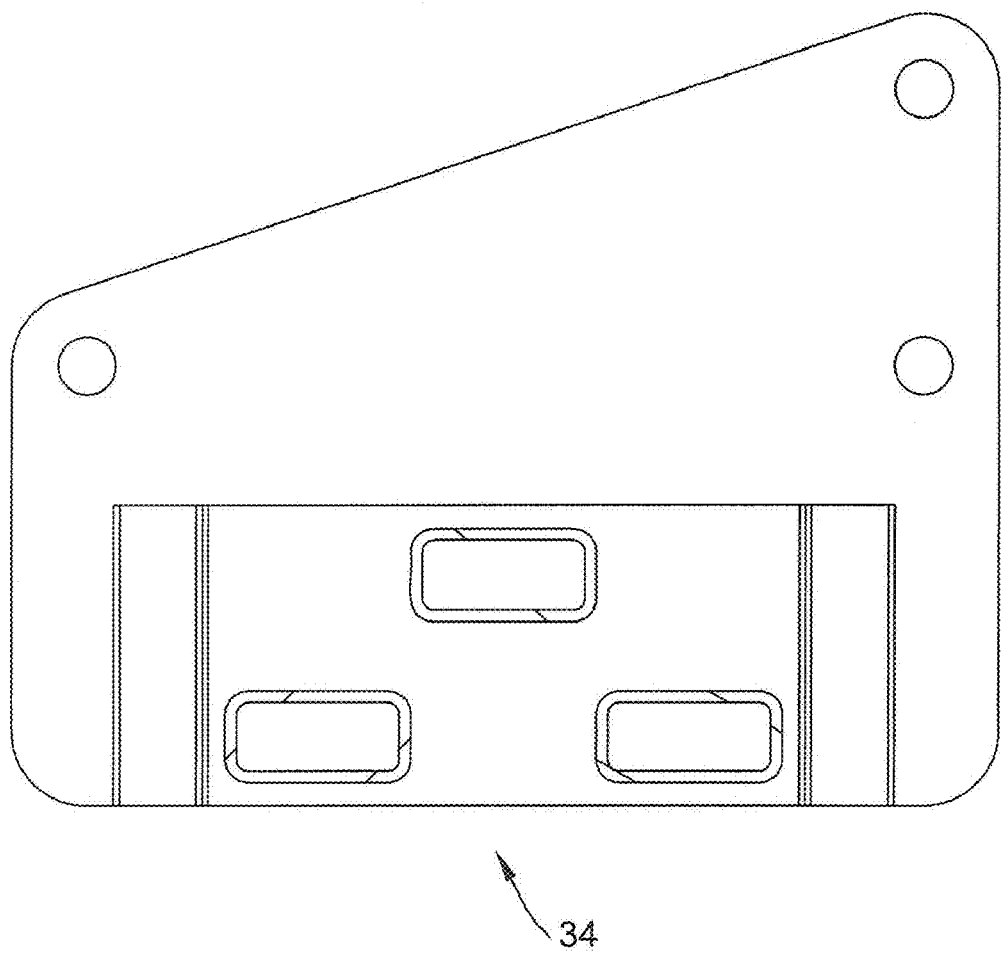
FIG. 10 is a cross-sectional view of the belt guidance system of FIG. 7 taken along line 10-10 in FIG. 9.

FIG. 7 shows a perspective view of the alignment guide 34. FIG. 8 shows a top view of the alignment guide 34. FIG. 9 shows a front view of the alignment guide 34. FIG. 10 shows a cross-sectional view of the alignment guide 34.

Figure 11:
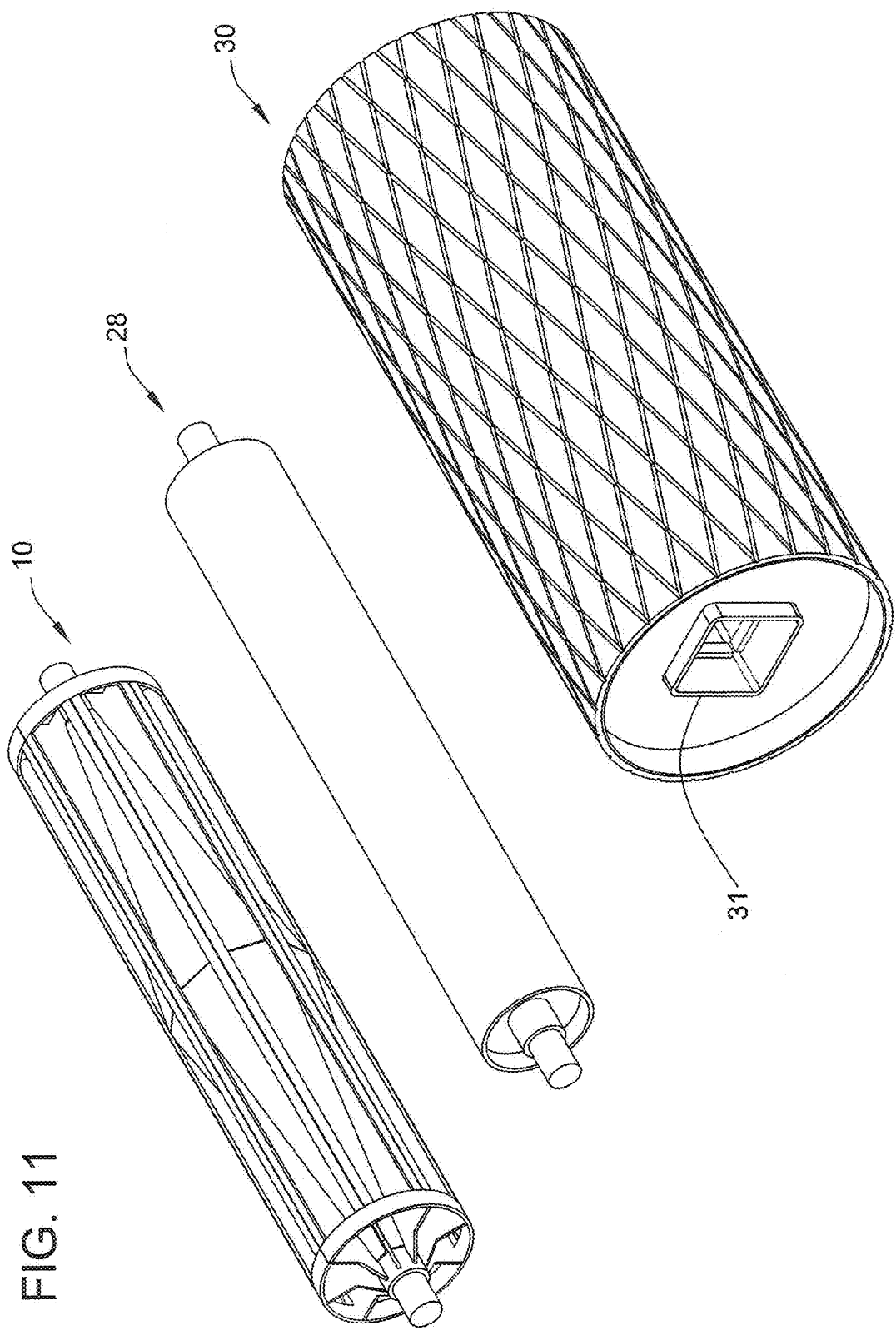
FIG. 11 is a perspective view of embodiments of a wing roller, a snub roller, and a drive roller suitable for use with the present invention.

FIG. 11 shows perspective views of embodiments of a wing roller 10, a snub roller 28, and a drive roller 30. The wing roller 10 is shown with a fin-based design that allows for easy cleaning. The drive roller 30 is shown with a square connection port 31.

Figure 12:
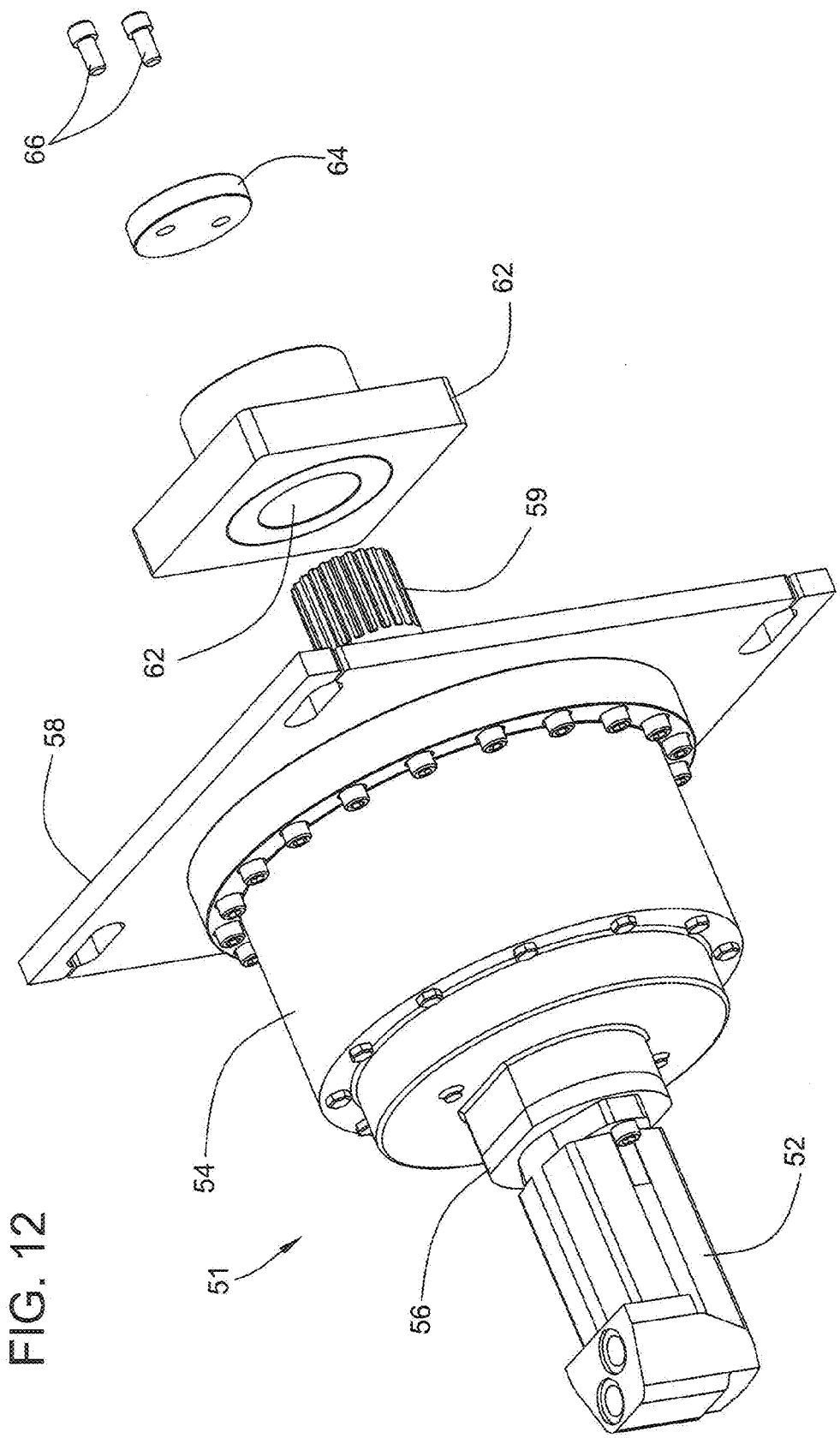
FIG. 12 is an exploded perspective view of an embodiment of a floating drive connection system with a square adaptor suitable for use with the present invention.

FIG. 12 is an exploded perspective view showing an embodiment of a floating drive connection system 51 for a square adaptor. A hydraulic motor 52 is shown connected to a planetary gear case 54 via a spacer plate 56. A mounting plate 58 is attached to the gear case 54 to allow for ready mounting of the system 51 to the vehicle. A splined shaft 59 extends from the motor 52 for attaching to a square adaptor 60 having an interior splined surface 62. The square coupler 60 is rotatively coupled to the motor 52 via the splined surfaces 59, 60. A keeper plate 64 and screws 66 can be used to retain the adaptor 60.

Figure 13:
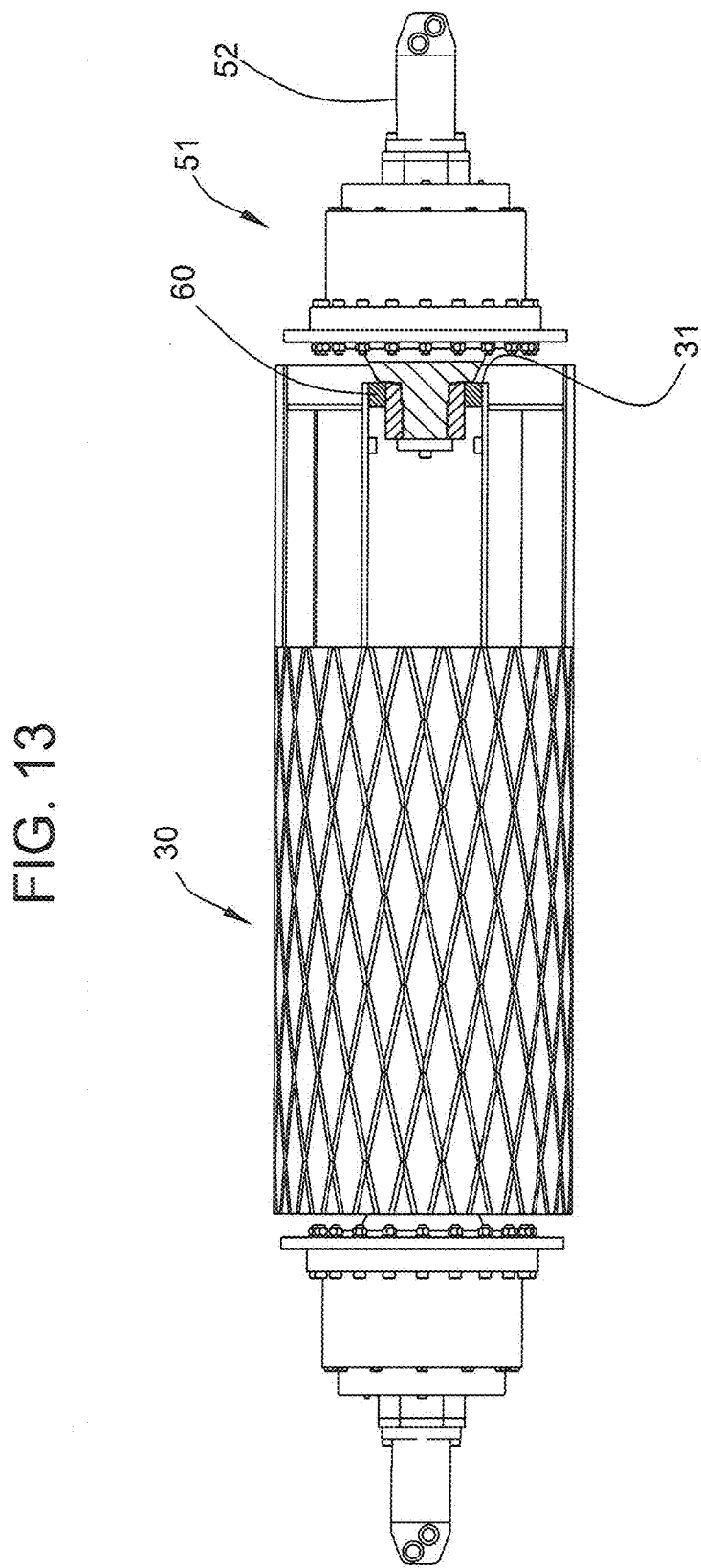
FIG. 13 is an elevational view of the floating drive connection system of FIG. 12 floatingly coupled to the drive roller of FIG. 11.

FIG. 13 shows the floating drive connection system 51 coupled to the drive roller 30. The square adaptor 60 is disposed within the square connection port 31 of the drive roller 30. The square adaptor 60 and/or the connection port 31 can be sized such that the square adaptor 60 is floatingly disposed within the square connection port 31. The square adaptor 60 can be sized such that the distance between its opposite corners is greater than the distance between opposite sides of the square connection port 31. Operation of the motor 52 rotates the square coupler 60 which in turn acts against the square connection port 31 of the drive roller 30 to rotate the roller 30.

Figure 14:
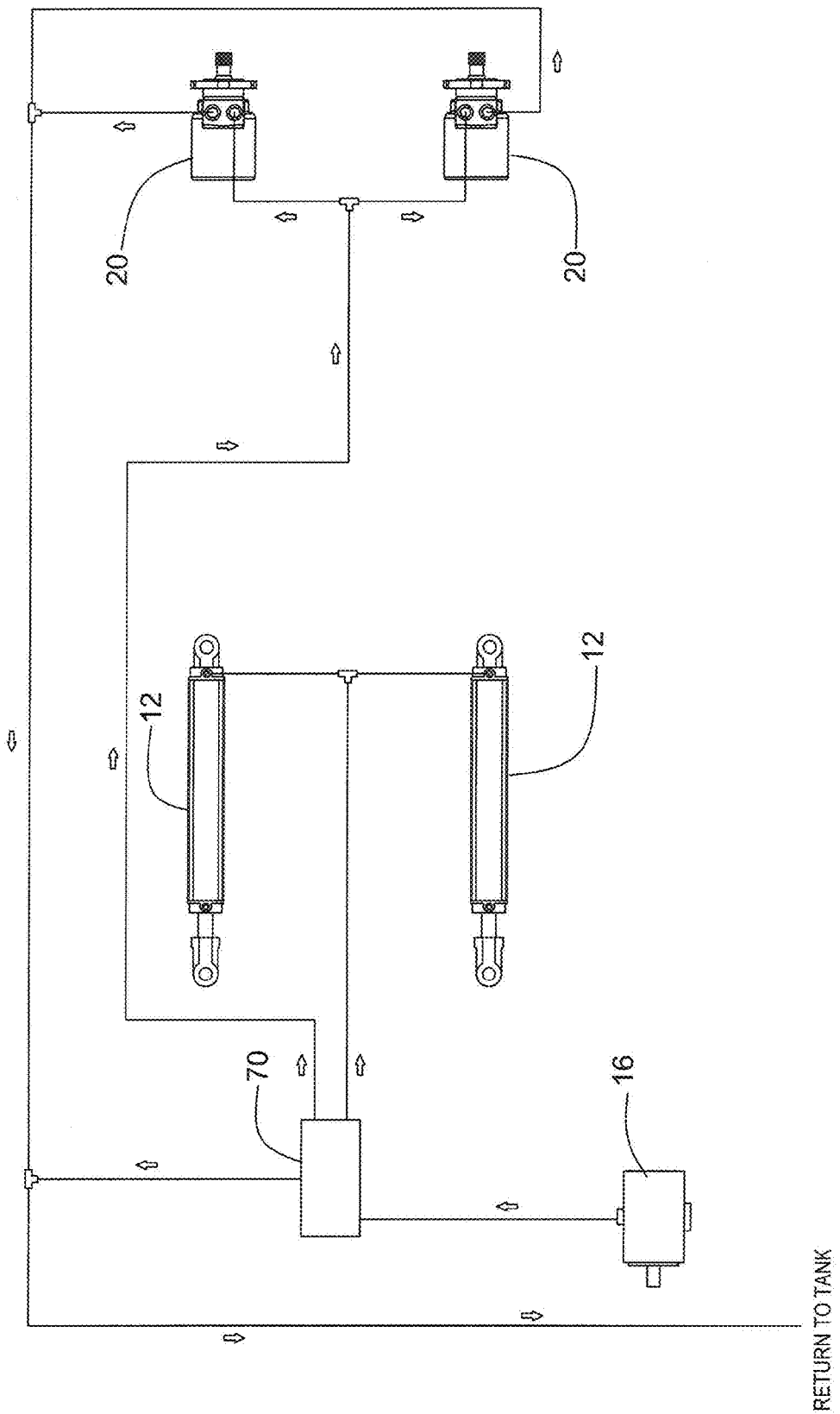
FIG. 14 is a schematic diagram of an embodiment of a vehicle conveyor hydraulic system, including a pump, cylinders, motors, and a logical sequence valve, suitable for use with the present invention.

FIG. 14 is a schematic diagram shows an embodiment of a vehicle conveyor hydraulic system including a pump 16, cylinders 12, motors 20, and a logical sequence valve 70. Hydraulic fluid comes from a tank (not shown) and is conveyed by the pump 16 to a logical sequence balancing system controlled by a logical sequence valve 70. The valve 70 regulates the hydraulic pressure between the cylinders 12 and the motors 20. The valve 70 thus controls the belt auto-tensioning system cylinders 12 to provide a variable mechanical tension force to the belt that adjusts to exceed the acceleration force generated by the drive drum motors 20.

In other embodiments, a method of using the vehicle conveyor system is disclosed. Such a method includes first providing a vehicle conveyor system as described above, second loading the vehicle under effectively relaxed belt conditions, third operating the auto-tensioning system prior to moving the belt, and finally unloading the vehicle by operating the belt. The vehicle to be operated may further include an existing feature selected from the group consisting of a hoist system, a live-bottom system, an extruding dump, a reciprocating slat conveyor, a side dump, a bottom dump, or any combination thereof. In preferred embodiments, the operating step of the method comprises activating a hydraulic pump. In more preferred embodiments, the operating step further comprises activating a logical sequence valve.

In other embodiments, a method of constructing a vehicle system conveyor is disclosed. Such a method includes first providing a vehicle and then second installing a conveyor system as substantially described above. The step of installing can comprise connecting a hydraulic pump, hydraulic pressure lines, and at least one hydraulically driven motor. The step of installing can further comprise connecting a logic sequence valve via the hydraulic pressure lines with the at least one hydraulically driven motor and the belt auto-tensioning system.

An example of an application in which embodiments of the conveyor system for a vehicle may be used will now be described. In this example, a new vehicle is selected or an existing vehicle is selected to use of the conveyor system in combination with the existing vehicles hoist system, live-bottom system, extruding dump, reciprocating slat conveyor, side dump, or bottom dump. Whether in a new vehicle or an existing vehicle, it is expected that the resulting conveyor system based vehicle would be useful for year round operation, for a wider variety of loaded materials, and would have reduced maintenance and operation costs.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A conveyor system for a vehicle comprising a vehicle with vertical-tending walls and a floor space containing a friction reducing plastic material, and a chassis mounted conveyor system, wherein the conveyor system comprises a belt, a first roller positioned adjacent the first end of the floor, a second roller positioned adjacent the second end of the floor, said conveyor system comprising:
    a belt auto-tensioning system adapted to automatically tension the belt prior to belt movement;
    a belt guidance system adapted to automatically align the belt;
    a belt anti-slippage system including a first roller and a drive drum coupled thereto for driving the belt, said drum comprising rubber vulcanized to a steel drum surface, and a snubber roller adapted to engage the belt against an exterior cylindrical surface of the drive drum such that the snubber roller covers at least about ¾ of the cylindrical surface of the drum; and
    a floating drive connection system including the drive drum having a square connector.

2. The conveyor system of claim 1, wherein the vertical-tending walls are substantially vertical.

3. The conveyor system of claim 1, wherein the belt comprises a bare back including a bottom layer comprising nylon cords or exposed mesh.

4. The conveyor system of claim 3, wherein the bare back belt comprises two or three plies of a fabric material.

5. The conveyor system of claim 3, wherein the bare back belt comprises a rubber top cover having a thickness of about ¼ to ½ inches.

6. The conveyor system of claim 1, wherein the belt auto-tensioning system comprises at least one cylinder sized to effectively tension the belt and to effectively allow the belt to relax during loading.

7. The conveyor system of claim 6, wherein the cylinder is operatively connected to the second roller and capable of moving the roller over a range of travel between a retracted position and an extended position.

8. The conveyor system of claim 6, wherein the belt auto-tensioning system provides variable mechanical tension force to the belt that adjusts to exceed acceleration force generated by the drive drum.

9. The conveyor system of claim 1, wherein the belt guidance system comprises at least one alignment guide to hold a bottom portion of the belt relatively flat.

10. The conveyor system of claim 9, wherein the alignment guide comprises upper and lower portions extending inwardly from the lateral side portions of a belt conveyor system frame.

11. The conveyor system of claim 10, wherein the alignment guide comprises a second member extending between the lateral side portions of the belt conveyor system frame.

12. The conveyor system of claim 11, wherein the upper and lower portions are positioned on one side of the belt and the second member is vertically positioned on the opposite side of the belt.

13. The conveyor system of claim 9, wherein the alignment guide comprises at least two vertically extending members positioned on opposite sides of the belt.

14. The conveyor system of claim 9, wherein the alignment guide is adapted to move with the second roller in response to changes in position of the the second roller.

15. The conveyor system of claim 1, wherein the belt anti-slippage system provides rubber-against-rubber engagement with the belt.

16. The conveyor system of claim 15, wherein the belt has no mechanical engagement with the belt anti-slippage system beyond frictional contact.

17. The conveyor system of claim 1, further comprising a hydraulic pump, hydraulic pressure lines, and at least one hydraulically driven motor connected to the drive drum.

18. The conveyor system of claim 17, wherein at least one hydraulic line is connected to the belt auto-tensioning system.

19. The conveyor system of claim 17, further comprising a logical sequence valve in hydraulic communication via the hydraulic pressure lines with the at least one hydraulically driven motor and the belt auto-tensioning system.

20. The conveyor system of claim 1, wherein the first or second or both rollers are fin-based.

21. A method of using a vehicle with a conveyor system comprising:
    providing a vehicle with vertical-tending walls and a floor space containing a friction reducing plastic material, and a chassis mounted conveyor system, wherein the conveyor system comprises a belt, a first roller positioned adjacent the first end of the floor, a second roller positioned adjacent the second end of the floor, said conveyor system comprising: a belt auto-tensioning system adapted to automatically tension the belt prior to belt movement; a belt guidance system adapted to automatically align the belt; a belt anti-slippage system including a drive drum coupled to a first roller for driving the belt, said drum comprising rubber vulcanized to a steel drum surface, and a snubber roller adapted to engage the belt against an exterior cylindrical surface of the drive drum such that the snubber roller covers at least about ¾ of the cylindrical surface of the drum, and a floating drive connection system including the drive drum having a square connector;
    loading the vehicle under effectively relaxed belt conditions;
    operating the auto-tensioning system prior to moving the belt; and
    unloading the vehicle by operating the belt.

22. The method of claim 21, wherein the vehicle further comprises at least one existing feature selected from the group consisting of a hoist system, a live-bottom system, an extruding dump, a reciprocating slat conveyor, a side dump, a bottom dump, or any combination thereof.

23. The method of claim 21, wherein operating comprises activating a hydraulic pump.

24. The method of claim 23, wherein operating further comprises activating a logical sequence valve.

25. A method of constructing a vehicle with a conveyor system comprising:
    providing a vehicle with vertical-tending walls and a floor space containing a friction reducing plastic material
    installing a chassis mounted conveyor system, wherein the conveyor system comprises a belt, a first roller positioned adjacent the first end of the floor, a second roller positioned adjacent the second end of the floor, said conveyor system comprising: a belt auto-tensioning system adapted to automatically tension the belt prior to belt movement; a belt guidance system adapted to automatically align the belt; a belt anti-slippage system including a drive drum coupled to a first roller for driving the belt, said drum comprising rubber vulcanized to a steel drum surface, and a snubber roller adapted to engage the belt against an exterior cylindrical surface of the drive drum such that the snubber roller covers at least about ¾ of the cylindrical surface of the drum; and a floating drive connection system including the drive drum having a square adaptor.

26. The method of claim 25, wherein installing comprises connecting a hydraulic pump, hydraulic pressure lines, and at least one hydraulically driven motor.

27. The method of claim 26, wherein installing further comprises connecting a logic sequence valve via the hydraulic pressure lines with the at least one hydraulically driven motor and the belt auto-tensioning system.

28. A conveyor system for a vehicle comprising a vehicle with vertical-tending walls and a floor space containing a friction reducing plastic material, and a chassis mounted conveyor system, wherein the conveyor system comprises a belt, a first roller positioned adjacent the first end of the floor, a second roller positioned adjacent the second end of the floor, said conveyor system comprising:
- a belt auto-tensioning system adapted to automatically tension the belt prior to belt movement, wherein the belt auto-tensioning system comprises at least one cylinder sized to effectively tension the belt and to effectively allow the belt to relax during loading, and wherein the cylinder is operatively connected to the second roller and capable of moving the roller over a range of travel between a retracted position and an extended position;
- a belt guidance system adapted to automatically align the belt;
- a belt anti-slippage system including a drive drum coupled to a first roller for driving the belt, said drum comprising rubber vulcanized to a steel drum surface, and a snubber roller adapted to engage the belt against an exterior cylindrical surface of the drive drum such that the snubber roller covers at least about ¾ of the cylindrical surface of the drum; and
- a floating drive connection system including the drive drum having an adaptor for non-linear torque transfer.

29. The conveyor system of claim 28, further comprising a hydraulic pump, hydraulic pressure lines, at least one hydraulically driven motor connected to the drive drum, and a logical sequence valve in hydraulic communication via the hydraulic pressure lines with the at least one hydraulically driven motor and the belt auto-tensioning system.

30. The conveyor system of claim 29, wherein the belt auto-tensioning system provides variable mechanical tension force to the belt that adjusts to exceed acceleration force generated by the drive drum.

* * * * *